United States Patent
Vandevelde et al.

(10) Patent No.: US 9,907,228 B2
(45) Date of Patent: Mar. 6, 2018

(54) GRAIN TANK WITH FORCE ASSISTING ELEMENT FOR COVER

(71) Applicant: CNH Industrial America LLC, New Holland, PA (US)

(72) Inventors: Pieter Vandevelde, Sint Michiels Brugge (BE); Pieter J. P. Willem, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/179,602

(22) Filed: Jun. 10, 2016

(65) Prior Publication Data

US 2016/0360696 A1     Dec. 15, 2016

(30) Foreign Application Priority Data

Jun. 10, 2015  (BE) .................................. 2015/5356

(51) Int. Cl.
    *A01D 41/12*   (2006.01)
    *B65D 88/12*   (2006.01)
    (Continued)

(52) U.S. Cl.
    CPC ......... *A01D 41/1208* (2013.01); *A01D 34/02* (2013.01); *A01D 41/06* (2013.01); *A01D 41/1217* (2013.01); *A01D 41/1226* (2013.01); *A01D 57/02* (2013.01); *A01F 7/06* (2013.01); *A01F 12/444* (2013.01); *A01F 12/446* (2013.01); *A01F 12/46* (2013.01);
    (Continued)

(58) Field of Classification Search
    USPC .................................................... 49/340, 344
    See application file for complete search history.

(56) References Cited

U.S. PATENT DOCUMENTS

| | | | |
|---|---|---|---|
| 5,151,064 | A | 9/1992 | Damman et al. |
| 6,074,298 | A | 6/2000 | Majkrzak et al. |

(Continued)

FOREIGN PATENT DOCUMENTS

| | | | |
|---|---|---|---|
| DE | 8521247 U1 | 10/1985 | |
| DE | 4320565 A1 | 1/1995 | |

(Continued)

OTHER PUBLICATIONS

EP16173876, Extended European Search Report, dated Nov. 3, 2016, 6 pages.

*Primary Examiner* — Alicia Torres
(74) *Attorney, Agent, or Firm* — Peter K. Zacharias; Patrick M. Sheldrake

(57) ABSTRACT

An agricultural harvester includes a chassis and a grain tank carried by the chassis. The grain tank includes a frame having an opening formed therethrough; a pair of tank cover sections movably associated with the frame such that the tank cover sections can switch between an open position and a covering position relative to the opening of the frame; and at least one actuator linked to at least one of the tank cover sections and configured to selectively provide a switching force. The agricultural harvester further includes a force assistor or a brake linked to one of the pair of tank cover sections and configured to apply an assist force or a braking force, respectively, to one of the pair of tank cover sections but not the other of the pair of tank cover sections.

9 Claims, 4 Drawing Sheets

(51) Int. Cl.
*E05F 15/53* (2015.01)
*A01D 34/02* (2006.01)
*A01D 41/06* (2006.01)
*A01D 57/02* (2006.01)
*A01F 7/06* (2006.01)
*A01F 12/44* (2006.01)
*A01F 12/46* (2006.01)
*E05F 5/12* (2006.01)
*A01D 101/00* (2006.01)

(52) U.S. Cl.
CPC .............. *B65D 88/126* (2013.01); *E05F 5/12* (2013.01); *E05F 15/53* (2015.01); *A01D 2101/00* (2013.01); *E05Y 2201/21* (2013.01); *E05Y 2900/518* (2013.01)

(56) References Cited

U.S. PATENT DOCUMENTS

| | | | |
|---|---|---|---|
| 6,508,705 B1 * | 1/2003 | Van Overschelde | A01D 41/1226 296/15 |
| 6,679,772 B2 | 1/2004 | Johnson et al. | |
| 7,018,290 B2 | 3/2006 | Ramon et al. | |
| 7,146,766 B2 * | 12/2006 | Finkelstein | E05F 1/1091 16/84 |
| 7,585,214 B1 | 9/2009 | Johnson et al. | |
| 7,927,201 B2 | 4/2011 | Stukenholtz et al. | |
| 8,029,346 B2 | 10/2011 | Sprau | |
| 8,146,974 B2 | 4/2012 | Horst | |
| 9,089,090 B2 | 7/2015 | Claes et al. | |
| 9,215,843 B2 | 12/2015 | Cooksey et al. | |
| 2003/0078085 A1 * | 4/2003 | Gerber | A01D 41/1226 460/119 |
| 2004/0254003 A1 * | 12/2004 | Colpaert | A01D 41/1208 460/119 |
| 2006/0028053 A1 * | 2/2006 | Turnbull | B60J 5/0487 296/190.08 |
| 2008/0261671 A1 | 10/2008 | Stukenholtz et al. | |
| 2009/0215509 A1 | 8/2009 | Johnson et al. | |
| 2011/0265684 A1 * | 11/2011 | Knight | B61D 39/001 105/377.06 |
| 2013/0234466 A1 * | 9/2013 | Schmeichel | B60J 7/085 296/100.14 |
| 2016/0001792 A1 * | 1/2016 | Gibney | B61D 39/001 105/377.06 |

FOREIGN PATENT DOCUMENTS

| | | |
|---|---|---|
| DE | 4333558 C1 | 1/1995 |
| DE | 4445933 A1 | 6/1996 |
| EP | 0819371 A1 | 1/1998 |

* cited by examiner

GRAIN TANK WITH FORCE ASSISTING ELEMENT FOR COVER

CROSS REFERENCE TO RELATED APPLICATION

This application claims priority to Belgium Application No. 2015/5356, filed Jun. 10, 2015, the contents of which are incorporated herein by reference.

FIELD OF THE INVENTION

The present invention relates to agricultural harvesters, and, more specifically to grain tanks for agricultural harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Some grain tanks are equipped with movable grain tank covers that move relative to the grain tank and can expand the capacity of the grain tank, in addition to covering the grain tank when the combine is not operating. Grain tanks can also include a bubble up auger, which redistributes the grain within the grain tank to allow for a more even level of grain within the grain tank. The bubble up auger can be mounted or otherwise linked to one of the grain tank covers so that as the grain tank cover raises and descends, the bubble up auger also raises and descends. This allows the position of the bubble up auger to be adjusted as the grain tank covers are adjusted. When the bubble up auger is mounted to one of the grain tank covers, it is imperative that this grain tank cover closes before the other grain tank cover without the bubble up auger. If the grain tank cover without the bubble up auger reaches the closed position first, serious secondary damage can occur from contact between the grain tank cover and the bubble up auger.

Normally, the closing sequence of the grain tank covers is suitable to ensure the grain tank cover with the mounted bubble up auger closes first. However, under certain conditions the closing sequence is not sufficient to ensure that the grain tank cover with the mounted bubble up auger closes first. Such conditions can be the combine being on a sloped surface such that the grain tank cover and mounted bubble up auger have to be closed against the slope or wind conditions that blow against the grain tank cover and mounted bubble up auger opposite to the closing direction. In these conditions, the risk of damage to components of the combine due to the grain tank cover without the bubble up auger closing first is elevated.

What is needed in the art is an agricultural harvester that can close the grain tank covers in the proper order regardless of the operating conditions.

SUMMARY OF THE INVENTION

An embodiment of the present invention provides a force assistor linked to one of the tank cover sections of a grain tank to provide an assist force to the linked tank cover section but not the other tank cover section.

In accordance with an aspect of the present invention, there is provided an agricultural harvester including a chassis and a grain tank carried by the chassis. The grain tank includes a frame having an opening formed therethrough; a pair of tank cover sections movably associated with the frame such that the tank cover sections can switch between an open position and a covering position relative to the opening of the frame; and at least one actuator linked to at least one of the tank cover sections and configured to selectively provide a switching force. The agricultural harvester is characterized by a force assistor or a brake linked to one of the tank cover sections and configured to selectively apply an assist force or a braking force, respectively, to one of the tank cover sections but not the other tank cover section.

In accordance with another aspect of the present invention, there is provided a method of switching a pair of tank cover sections associated with a grain tank of an agricultural harvester from an open position to a covering position. The method includes the step of applying a switching force from at least one actuator to the tank cover sections to switch the tank cover sections between the open position and covering position. The method is characterized by applying an assist force or a braking force to one of the tank cover section so that one of the tank cover sections assumes the covering position before the other tank cover section.

An advantage of embodiments of the present invention is that the force assistor or brake can ensure the proper tank cover section closes first.

Another advantage is that the force assistor or brake can be a gas strut or other component that is relatively inexpensive to manufacture.

Yet another advantage is that the force assistor can be cheaply and easily tailored to a wide variety of tank cover section and bubble up auger configurations.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
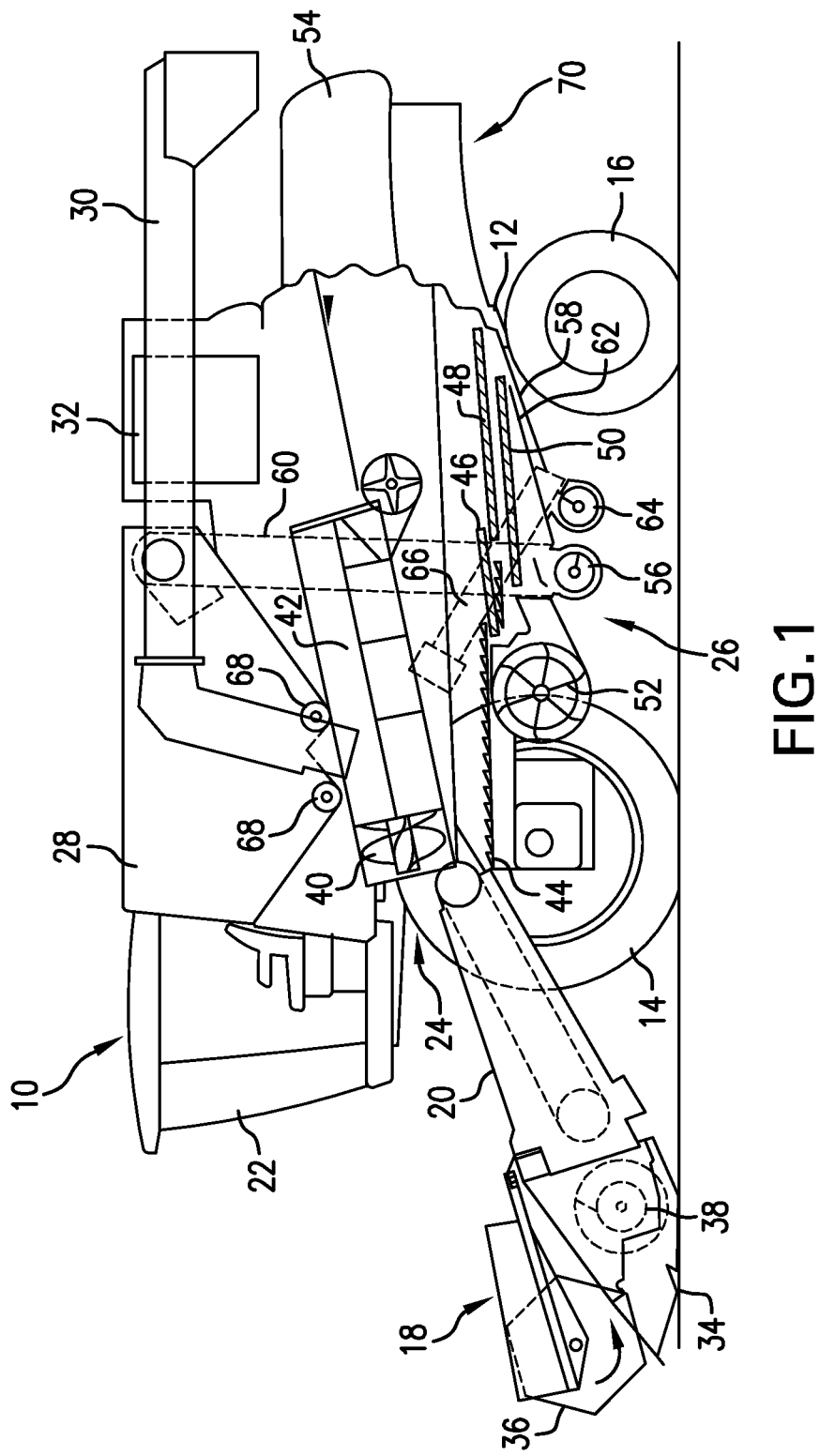
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
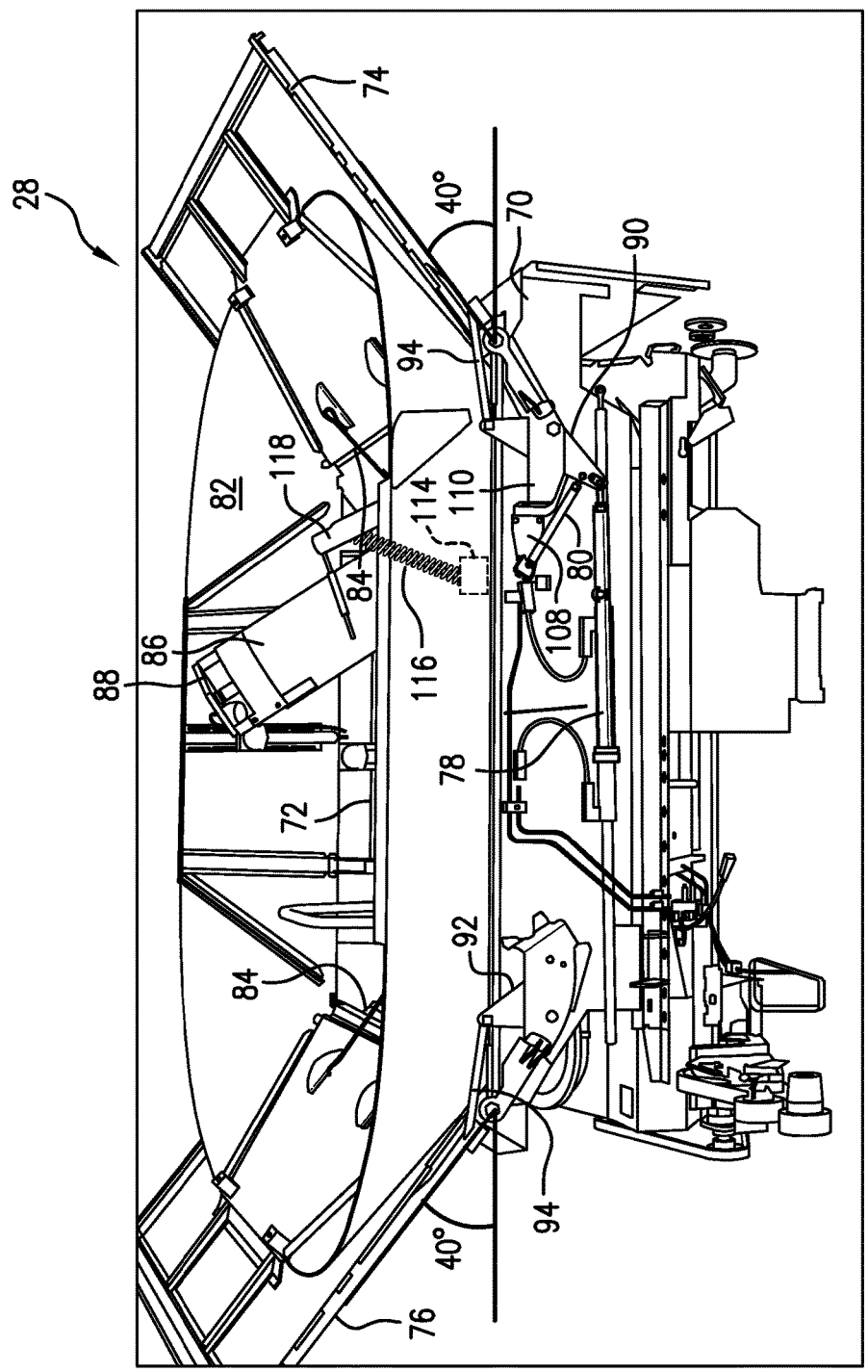
FIG. 2 is a side view of an embodiment of a grain tank of the present invention with tank cover sections in an open position.

According to an aspect of the present invention and referring now to FIG. 2, the grain tank 28 is shown and generally includes a frame 70 having an opening 72 formed therethrough, a pair of tank cover sections 74 and 76 that are movably associated with the frame 70, an actuator 78 linked to the tank cover section 74, and a force assistor 80 linked to the tank cover section 74. The tank cover section 74 is connected to front and rear covers of the grain tank 28 by a linkage system (not shown) inside the grain tank 28, so that the tank cover section 74 and front and rear covers always move together. As can be seen, the frame 70 forms the body of the grain tank 28 and can be expanded by the tank cover sections 74 and 76, the front and rear covers, a bubble up extension, as well as an expandible element 82 that is raised and lowered with the tank cover sections 74 and 76. In this sense, the capacity of the grain tank 28 can be increased by raising the tank cover sections 74 and 76 as well as the expandible element 82, which is shown as four rubber corners moving together with the tank cover sections 74 and 65.

The tank cover sections 74 and 76, as well as the unnumbered front and rear covers, are movably associated with the frame 70 so that they can switch between an open position (shown in FIGS. 2-3), and a covering position (shown partially in FIG. 4) relative to the opening 72. As shown, the tank cover sections 74 and 76 are hinged to the frame 70 by hinges 84 so the tank cover sections 74 and 76 can pivot about axes of rotation defined by the hinges 84 to an opening angle relative to the opening 72, shown as 40 degrees in FIG. 2. While the tank cover sections 74 and 76 are shown as being hinged to the frame 70, it is contemplated that the tank cover sections 74 and 76 could be movably associated with the frame 70 in other ways, such as by sliding. As can be seen, a bubble up auger 86 is mounted to the tank cover section 74 so that as the tank cover section 74 pivots about its hinge 84, the bubble up auger 86 can be raised and lowered within the grain tank 28 relative to the opening 72. This allows for an output end 88 of the bubble up auger 86 to raise and lower as the capacity of the grain tank 28 changes, which can correspond to increasing and decreasing amounts of grain held within the grain tank 28. This is important for fill distribution and to lower power consumption by preventing the output end 88 from being buried under too much grain or being held too high above the grain level.

An actuator 78 is connected to the frame 70 and is linked to the tank cover section 74 to selectively provide a switching force to the tank cover section 74 that forces the tank cover section 74 between the open position and covering position. Both tank cover sections 74 and 76 can be linked to actuator 78 to switch between the open and covering positions. The actuator 78 can be linked to the tank cover sections 74 and 76 by cover links 90 and 92 so that the actuator 78 does not need to be directly linked to the tank cover sections 74 and 76 to provide the switching force to the tank cover sections 74 and 76. The cover links 90 and 92, as shown, are linkage triangles that are connected to their respective tank cover sections 74 and 76 by hinge shafts 94, allowing the switching force that acts on the cover links 90 and 92 from the actuator 78 to be transmitted to the tank cover sections 74 and 76 to switch the tank cover sections 74 and 76 between the open position and covering positions. Since the tank cover sections 74 and 76 are both linked to the actuator 78, the actuator 78 can raise the tank cover sections 74 and 76 simultaneously relative to the opening 72.

Figure 3:
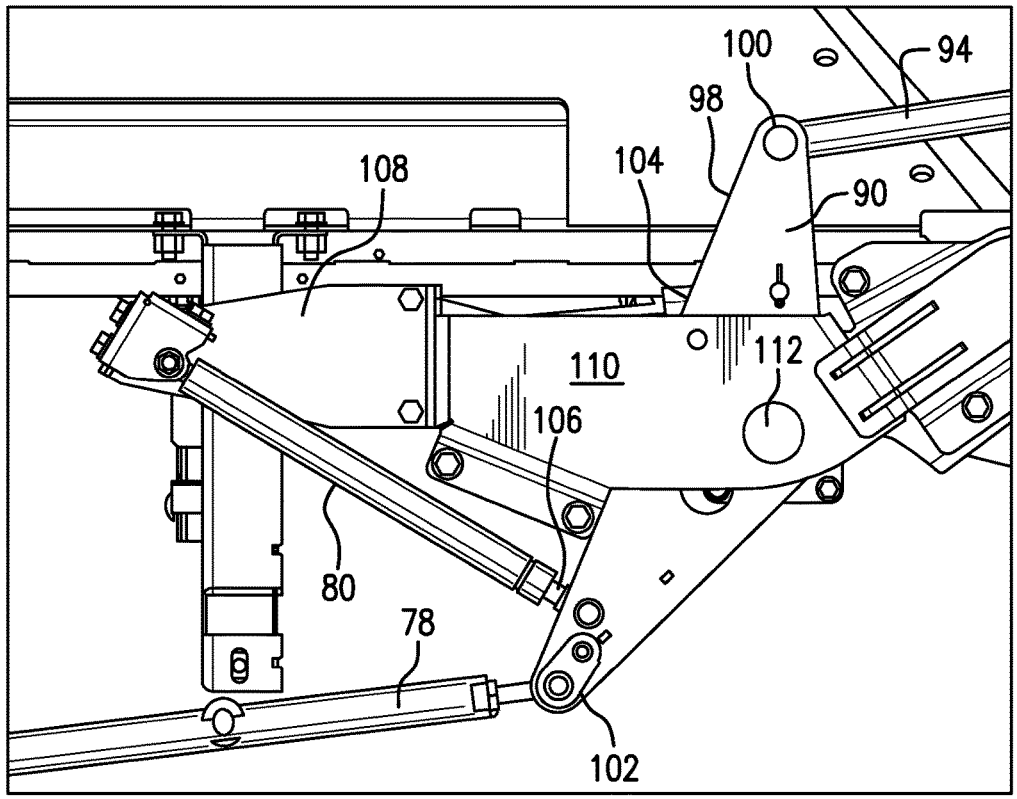
FIG. 3 is a side close-up view of an embodiment of a force assistor of the present invention linked to a tank cover section in the open position.

Referring now to FIG. 3, there is shown a close-up view of the linkage between the force assistor 80 and the cover link 90, shown as a linkage triangle, which is connected to the tank cover section 74. As can be seen, the linkage triangle 90 defines a base 98 with one end 100 of the base 98 connected to the hinge shaft 94, and thus the tank cover section 74, and an opposite end 102 of the base 98 connected to the force assistor 80 and the actuator 78. The force assistor 80 can be a gas strut, as shown, or other fluidly driven actuator that applies an assist force to the tank cover section 74 by extension and/or retraction of a piston rod 106, either directly or through the linkage triangle 90 connected to the tank cover section 74 as shown. Alternatively, the force assistor 80 can be a compression spring or other type of element that pushes on the linkage triangle 90. The gas strut 80 can be mounted to the frame 70 by a mounting bracket 108 or otherwise so that the gas strut 80 can extend the piston rod 106 to provide the assist force to the tank cover section 74. In other words, the piston rod 106 should be movable relative to the tank cover section 74 so the assist force provided by extension and/or retraction of the piston rod 106 can be applied to the tank cover section 74. The gas strut 80 can also be fixed to the rearwall of the frame 70 or the mounting bracket 108 can be formed as an integral piece with a triangle bracket 110 which is connected to the frame 70. The linkage triangle 90 can be pivotally connected to the triangle bracket 110 by a pivot pin 112. The pivot pin 112 therefore defines a pivot point that the linkage triangle 90 can pivot about in response to forces applied to the linkage triangle 90, which can then be applied to other components through the linkage triangle 90. The mounting bracket 108 can also be connected to the triangle bracket 110, if desired. As can be seen, when the linkage triangle 90 is positioned as shown in FIGS. 2-3, the tank cover section 74 is hinged outwardly relative to the opening 72 by the hinge shaft 94 pushing the tank cover section 74 in that direction so that the tank cover section 74 is in the open position.

Figure 4:
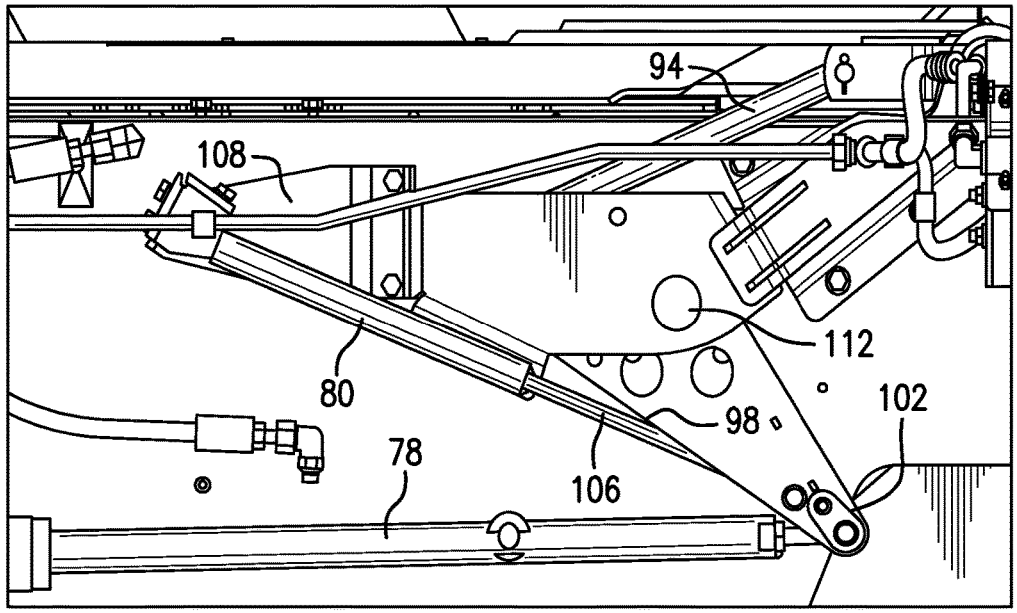
FIG. 4 is a side close-up view of the force assistor of FIG. 3 linked to the tank cover section in a covering position.

Referring now to FIG. 4, it can be seen that the switching force has been applied to the linkage triangle 90 by extension of the actuator 78 so that the linkage triangle 90 pivots about the pivot pin 112 and pulls the hinge shaft 94 connected to the tank cover section 74 inwardly. As can be seen, the actuator 78 pushes on the linkage triangle 90 in a direction opposite to the movement of the hinge shaft 94. As such, the linkage triangle 90 acts as a force reversing mechanism to pull the hinge shaft 94 inwardly while the end 102 of the linkage triangle 90 connected to the actuator 78 is forced outwardly by the switching force. This inward movement of the hinge shaft 94 causes the tank cover section 74 to pivot about the hinge 84 toward the opening 72, so that the tank cover section 74 can assume the covering position. In instances where more force than the switching force from the actuator 78 is needed to close the tank cover section 74 first, such as when the agricultural harvester 10 is on a slope and the tank cover section 74 must be pulled inwardly against the slope, the gas strut 80 provides an assist force to the linkage triangle 90 to help pull the tank cover section 74 toward the opening 72. Thus, the tank cover section 74 is pulled toward the opening 72 by both the assist force provided by the gas strut 80 and the switching force provided by the actuator 78. The assist force provided by the gas strut 80 to the tank cover section 74 can be adjusted to various magnitudes, depending on the desired applied assist force, by adjusting the gas strut 80 that is chosen. However, it should be appreciated that the main force to switch the tank cover sections 74 and 76 between the open and covering positions comes from the linked actuator 78, with the assist force provided by the gas strut 80 being relatively small in comparison to the actuator 78 provided force but allowing for a better force distribution between the tank cover sections 74 and 76 compared to both tank cover sections 74 and 76 being moved only by the actuator 78. Therefore, the assist force is only applied to the tank cover section 74 to which the bubble up auger 86 is mounted, which can ensure that the tank cover section 74 switches to the covering position before the other tank cover section 76, which does not have a mounted bubble up auger, and damage caused by an improper closing sequence can be avoided. Using a gas strut 80 to ensure the proper closing sequence of the tank cover sections 74 and 76 allows for a relatively inexpensive solution compared to the alternative: redesigning the links between the actuator 78 and the tank cover sections 74 and 76. Further, the gas strut 80 can be easily replaced by different force assistors or gas struts to provide different assist forces to the tank cover section 74, depending on the weight and operating conditions of the tank cover section 74 and bubble up auger 86.

Optionally, a force sensor 114 can be associated with the force assisted tank cover section 74 that measures an amount of force applied to the tank cover section 74 away from the opening 72. The force sensor 114 can be, for example, statically mounted to the frame 70 and attached by a spring 116 to a bubble up mount 118 that mounts the bubble up auger 86 to the tank cover section 74. The force sensor 114 can then measure the tensile force in the spring 116 to determine how much force is being applied to the bubble up mount 118, and thus the tank cover section 74, away from the force sensor 114. Such force sensors are known, and further description of such a sensor is therefore omitted. The force sensor 114 can be coupled to a controller (not shown) which controls a gas supply (not shown) to the gas strut 80. The controller can be configured so that, based on the measured force reading from the force sensor 114, it determines a needed assist force required to ensure that the force assisted tank cover section 74 is switched to the covering position before the unassisted tank cover section 76. The controller can then control the gas supply of the gas strut 80 so that the proper amount of gas is supplied to the gas strut 80 to apply the needed assist force to the force assisted tank cover section 74.

Figure 5:
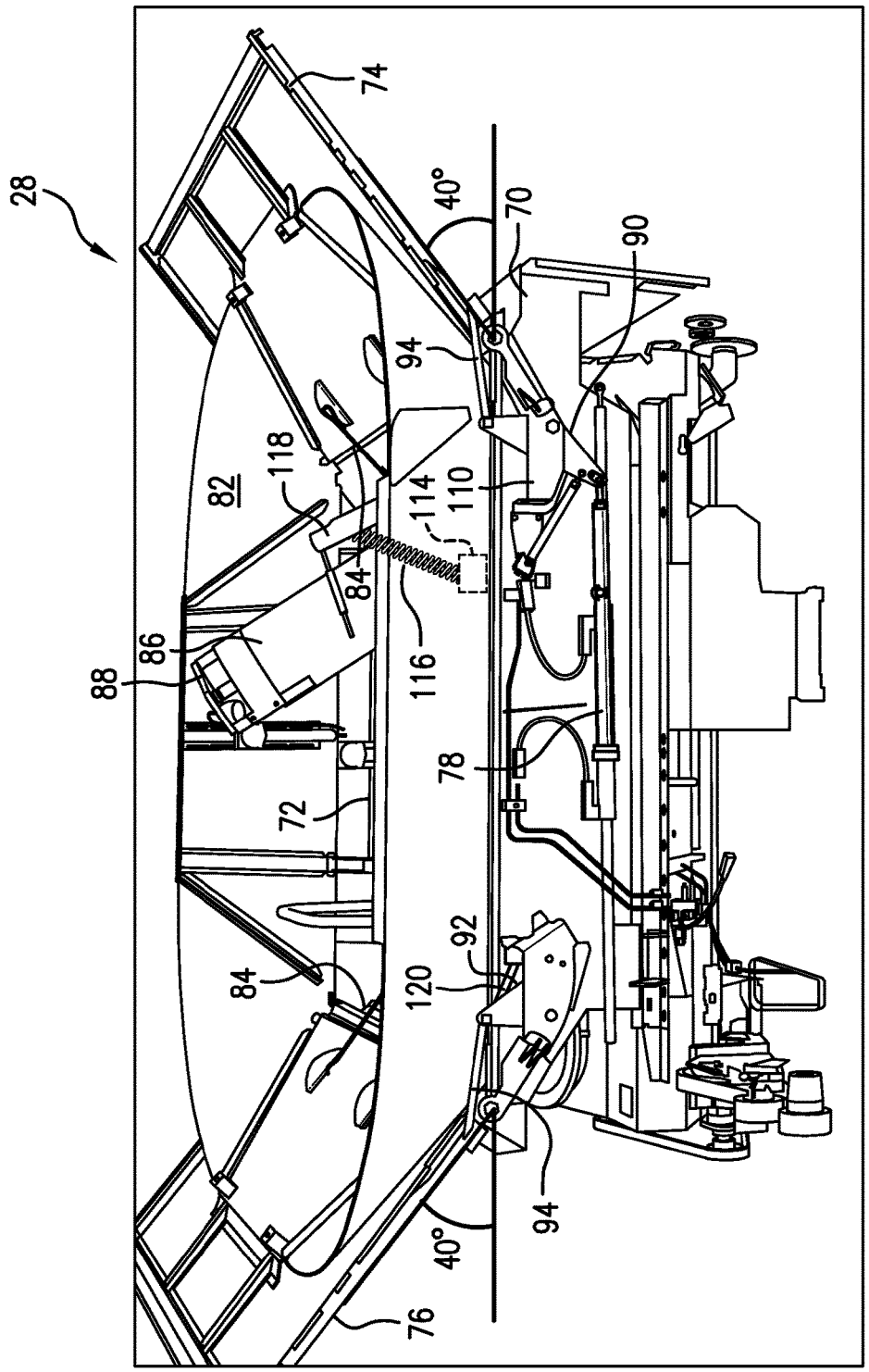
FIG. 5 is a side view of an alternative embodiment of the grain tank shown in FIG. 2 with a brake linked to one of the tank cover sections in the open position.

In an alternative embodiment, shown in FIG. 5, a brake 120, shown as a fluid actuated brake, can be linked to the tank cover section 76 that does not have the mounted bubble up auger 86 so that the fluid actuated brake 120 provides a braking force to the tank cover section 76. While the brake 120 is shown as a fluid actuated brake, the brake 120 could also be in the form of a compression spring or other element that provides a braking force. As can be seen, the fluid actuated brake 120 is linked to the tank cover section 76 by connection to the linkage triangle 92, with the fluid actuated brake 120 being connected to the linkage triangle 92 at a point where a pushing force provided by the fluid actuated brake 120 impedes the closing movement of the tank cover section 76. This allows the brake 120 to impede the tank cover section 76 from closing, but not the other tank cover section 74 with the mounted bubble up auger 86. Braking the tank cover section 76 independently of the tank cover section 74 allows the tank cover section 74 with the mounted bubble up auger 86 to close sooner than the impeded tank cover section 76 to reduce the risk of damage to the grain tank 28. It should therefore be appreciated that the brake 120 can be linked to the tank cover section 76 without the mounted bubble up auger 86 rather than the force assistor 80 being linked to the tank cover section 74 with the mounted bubble up auger 86.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester, comprising:
    a chassis;
    a grain tank carried by the chassis, the grain tank comprising:
        a frame having an opening formed therethrough;
        a pair of tank cover sections movably associated with the frame such that the tank cover sections can switch between an open position and a covering position relative to the opening of the frame;
        a pair of cover links, each respectively linked to one of the pair of tank cover sections; and
        at least one actuator linking the cover links to the frame and configured to selectively provide a switching force to the pair of tank cover sections for switching between the open position and the covering position; and
    a force assistor linking one of the cover links to the frame and configured to selectively apply, during the switching between the open position and the covering position, an assist force to the tank cover section linked to the one of the cover links in a direction opposite to movement of the tank cover section linked to the one of the cover links but not to the tank cover section linked to another of the cover links.

2. The agricultural harvester of claim 1, wherein the cover links are linked to raise the pair of tank cover sections simultaneously.

3. The agricultural harvester of claim 1, wherein at least one of the cover links is a linkage triangle.

4. The agricultural harvester of claim 1, wherein the at least one actuator consists of one actuator linked to the pair of tank cover sections via the cover links, one of the cover links acting as a force reversing mechanism for the switching force.

5. The agricultural harvester of claim 1, further comprising a bubble up auger mounted to the tank cover section linked to the force assistor.

6. The agricultural harvester according to claim 5, wherein the assist force causes the tank cover section with the mounted bubble up auger to assume the covering position before the other tank cover section.

7. The agricultural harvester of claim 1, wherein the force assistor is a fluidly driven actuator.

8. The agricultural harvester of claim 7, wherein the fluidly driven actuator is a gas strut.

9. The agricultural harvester of claim 1, further comprising at least one force sensor associated with the force assisted tank cover section.

* * * * *